United States Patent [19]

Inada et al.

[11] Patent Number: 4,512,546
[45] Date of Patent: Apr. 23, 1985

[54] SOLENOID ACTUATED VALVE DEVICE

[75] Inventors: Masami Inada; Kenji Hashimoto, both of Aichi, Japan

[73] Assignee: Aisin Seiki Kabushiki Kaisha, Japan

[21] Appl. No.: 335,430

[22] Filed: Dec. 29, 1981

[30] Foreign Application Priority Data

Dec. 29, 1980 [JP] Japan ............................ 55-187712[U]

[51] Int. Cl.³ ............................................. F16K 31/08
[52] U.S. Cl. ...................................... 251/65; 251/129
[58] Field of Search .................................. 251/129, 65

[56] References Cited

U.S. PATENT DOCUMENTS 4,216,938 8/1980 Inada et al. ............................ 251/65
4,307,752 12/1981 Inada et al. ..................... 137/625.48

Primary Examiner—Arnold Rosenthal
Attorney, Agent, or Firm—Sughrue, Mion, Zinn, Macpeak & Seas

[57] ABSTRACT

The present invention provides a new and improved solenoid actuated valve device for controlling the flow of fluid comprising a body having an inlet and an outlet port extending therethrough, a hollow tubular core axially mounted within said body with one end thereof disposed in communication with said outlet port and having at least one radially extending aperture therethrough to provide communication between said inlet port and said outlet port, a bobbin slidably mounted on said core to control the effective open area of said aperture, a solenoid coil wound on said bobbin, an annular yoke resiliently mounted within said body, permanent magnets secured in said yoke so that the magnetic flux thereof intersects the windings of said solenoid coil at right angles thereto, a cover secured to said body in engagement with the other end of said core, said body, said cover member, said yoke and said core being of magnetic material to define a magnetic circuit with said permanent magnets to provide a magnetic force causing said bobbin to move relative to said core when an electric current passes through said coil, springs biasing said bobbin to a position closing said aperture and resilient stoppers against which said bobbin will bear in the closed position relative to said aperture. The resilient stoppers also act to resiliently support one end of the yoke in sealing engagement with the body intermediate said inlet and said outlet ports.

1 Claim, 1 Drawing Figure

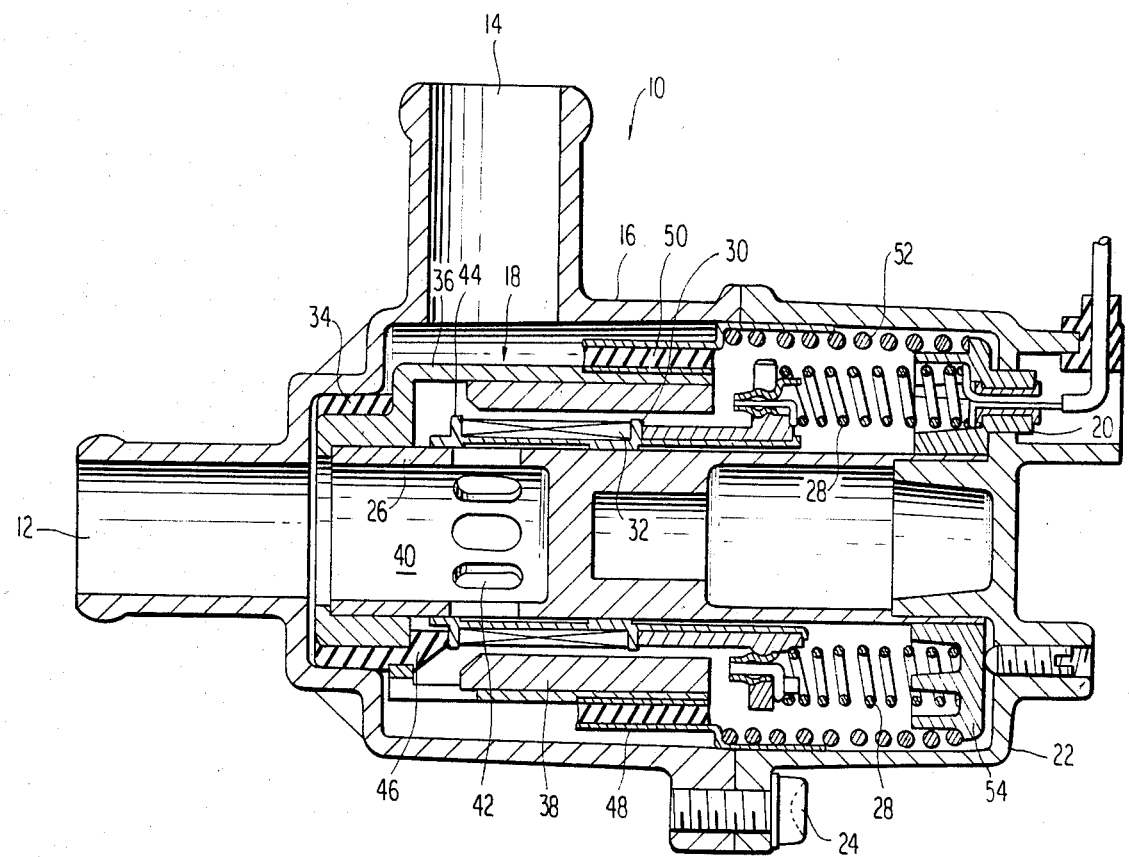

SOLENOID ACTUATED VALVE DEVICE

BACKGROUND OF THE INVENTION

The present invention is directed to a solenoid actuated valve device and more particularly to a solenoid actuated valve device for controlling the flow of fluid in proportion to the electric current energizing the solenoid.

A conventional solenoid actuated valve device is comprised of a linear motor of the movable coil type, a valve means and spring means normally biasing the valve means to the closed position. The linear motor includes a core, a bobbin slidably mounted on the core, a solenoid coil wound on the bobbin, permanent magnets mounted adjacent the solenoid coil so that the magnetic flux of each magnet intersects the winding of the solenoid coil at right angles thereto and a yoke or body forming a magnetic circuit with the core. The valve means in general includes a sliding valve member which slides with the bobbin on the core against the biasing force of the spring means in response to an electric current flowing through the solenoid coil to thereby proportionally control the opening and closing of apertures formed in the core between an inlet port and an outlet port.

The U.S. Pat. No. 4,286,767 to Hashimoto granted Sept. 1, 1981, the U.S. Pat. No. 4,216,938 to Inada et al granted Aug. 12, 1980 and U.S. patent application Ser. No. 105,438 filed Dec. 19, 1979 in the name of Inada et al are examples of such solenoid actuated valve devices. The foregoing application and patents are each assigned to the same assignee as the present application.

In such prior solenoid actuated valves, the valve means are returned to their original closed position by the biasing force of the spring means. Since the electric current to the solenoid is interrupted abruptly the spring means will return the valve quickly so that the end of the valve means will hit against a stopper which is generally formed integrally with the body with a considerable amount of force. In addition to the undesirable noise created by such a condition, the constant banging of the valve means against the stopper tends to affect the reliability and long life of the solenoid actuated valve.

SUMMARY OF THE INVENTION

The present invention provides a new and improved solenoid actuated valve device which obviates the abovementioned drawbacks of conventional prior art solenoid actuated valve devices while providing a unique mounting arrangement for the yoke and permanent magnets which in turn leads to a quieter operation and longer life of the valve device.

The present invention provides a new and improved solenoid actuated valve device for controlling the flow of fluid comprising a body having an inlet and an outlet port extending therethrough, a hollow tubular core axially mounted within said body with one end thereof disposed in communication with said outlet port and having at least one radially extending aperture therethrough to provide communication between said inlet port and said outlet port, a bobbin slidably mounted on said core to control the effective open area of said aperture, a solenoid coil wound on said bobbin, an annular yoke resiliently mounted within said body, permanent magnet means secured in said yoke so that the magnetic flux thereof intersects the windings of said solenoid coil at right angles thereto, cover means secured to said body in engagement with the other end of said core, said body, said cover member, said yoke and said core being of magnetic material to define a magnetic circuit with said permanent magnet means to provide a magnetic force causing said bobbin to move relative to said core when an electric current passes through said coil, spring means biasing said bobbin to a position closing said aperture and resilient stopper means against which said bobbin will bear in the closed position relative to said aperture. The resilient stopper means also acts to resiliently support one end of the yoke in sealing engagement with the body intermediate said inlet and said outlet ports.

The foregoing and other objects, features and advantages of the invention will be apparent from the following more particular description of a preferred embodiment of the invention as illustrated in the accompanying drawing.

BRIEF DESCRIPTION OF THE DRAWINGS

The sole FIGURE is a sectional view of a solenoid actuated valve device according to the present invention.

DETAILED DESCRIPTION OF THE INVENTION

In accordance with the construction shown in the drawing, a solenoid actuated valve device 10 is comprised of a housing including a body 16 having a radially disposed outlet port 14, an axially disposed inlet port 12 and a cover member 22 sealingly secured to the end of the body 16 opposite the inlet port 12. A hollow tubular core 26 of a suitable magnetic material such as steel is axially positioned within the body 16 and the central hollow portion of the core 26 is divided to form a chamber 40 by means of a transversely extending divider wall. The chamber 40 is in communication with the inlet port 12. A bobbin 30 is slidably mounted on the core 26 and is made of a suitable non-magnetic material such as a synthetic resin or the like and a solenoid coil 32 is wound on the bobbin 30. A pair of permanent magnets 38 are secured to a yoke 36 of magnetic material. One end of the yoke 36 is inserted between the body 16 and the core 26 and is supported within the body 36 by an annular ring of resilient sealing material 34 made of a suitable elastomeric material. The opposite end of the yoke 36 is supported by a second annular ring 50 of a suitable elastomeric material. The elastomeric ring 50 is supported by means of a holder 48 which is supported by the body 16 or the cover 22. Thus, the yoke is completely supported within the body 16 by means of resilient elastomeric material.

The pair of permanent magnets 38 are so positioned that the magnetic flux of each of the magnets 38 intersects the windings of the coil 32. Thus, a magnetic circuit for the magnets 38 is formed by means of core 26 and yoke 36 thereby defining a linear motor 18 of the movable coil type. A sliding valve 44 having an annular sleeve configuration is formed integrally with the bobbin 30 and is slidably supported on the core 26. The core 26 has a plurality of axially elongated openings or apertures 42 to provide fluid communication between the inlet port 12 and the outlet port 14 through the chamber 40. The sliding valve 44 is adapted to be moved relative to the apertures 42 in proportion to the electric current supplied to the coil 32 and thus, the effective area of the apertures 42 is proportionally controlled.

The cover member 22 provides a guide portion which is disposed in contact with the adjacent end of the core 26. A retainer 54 is mounted on said adjacent end of said core 26 and is securely held in position by means of a spring 52 which is inserted between the holder 48 and the retainer 54. A pair of springs 28 are inserted between the retainer 54 and the bobbin 30. Both springs 28 bias the bobbin toward the left as viewed in the drawing so that the valve 44 on the bobbin 30 is normally maintained in the illustrated position with the left end of the valve 44 maintained in contact with stopper portions 46 which are formed by partial extensions of the sealing means 34. As a result the sliding valve 44 is maintained in the illustrated position with the apertures 42 closed. The ends of the springs 28 adjacent the bobbin are connected to opposite ends of the solenoid coil 32 while the opposite ends of the springs 28 which extend through the retainer are connected to a suitable power supply by means of terminals 20, only one of which is shown in the drawing. Thus, the springs 28 also function as electrically conductive members.

The operation of the solenoid actuated valve device will now be set forth in detail. Under normal or nonoperating conditions where no electric current flows through the solenoid coil 32, the bobbin 30 with the sliding valve 44 is maintained in its illustrated position by means of the springs 28 whereby the apertures 42 are closed by the sliding valve 44. Under these conditions the fluid communication between the inlet port 12 and the outlet port 14 is interrupted. The magnetic flux of the magnets 38 form a closed loop through the core 26, the yoke 36 and the coil 32. When an electric current flows through the solenoid coil 32, an electric magnetic force is generated in proportion to the electric current which will move the bobbin 30 having the coil 32 and the valve 44 thereon to the right against the biasing force of the springs 10 as viewed in the drawing. Accordingly, the apertures 42 are opened to an extent determined by the movement of the bobbin 30 and thus the effective open area of the apertures 42 is proportionally increased in proportion to the righthand movement of the bobbin 30 having the sliding valve 44 thereon.

When the electric current is interrupted, the electromagnetic force generated by the electric current disappears and the bobbin 30 is abruptly moved to the left by the biasing force of the springs 28. Consequently, the sliding valve 44 which is formed integrally with the bobbin 30 strikes against the stopper portions 46 which are constructed of a resilient elastomeric material. As a result, the striking sound is substantially eliminated. The elastomeric sealing means 34, in addition to having the stop portions 46 integral therewith, also provide a resilient seal between the yoke 36 and the end of the body 16 adjacent the inlet port 12. Thus, communication between the inlet port 12 and the outlet port 14 is effectively blocked except for passage through the apertures 42 and the yoke 36 having the permanent magnets 38 secured thereto is resiliently mounted within the body 16 to effectively damp any vibrations which may occur in the operation of the device. Thus, the damping of vibrations and elimination of shock caused by the valve 44 reaching its closed position provide for a quiet, shock and vibration free operation of the valve device which will significantly contribute to the longer life of the valve device.

While the invention has been particularly shown and described with reference to a preferred embodiment thereof, it will be understood by those in the art that various changes in form and details may be made therein without departing from the spirit and scope of the invention.

What is claimed is:

1. A solenoid actuated valve device for controlling the flow of fluid comprising a body having an inlet port and an outlet port, a hollow tubular core axially mounted within said body with one end thereof disposed in communication with said outlet port and having at least one radially extending aperture therethrough to provide communication between said inlet port and said outlet port, an annular yoke supported at one end thereof on said one end of said core, a bobbin having valve means being slidably mounted on said core within said yoke to control the effective open area of said aperture, a solenoid coil wound on said bobbin, permanent magnet means secured within said yoke so that the magnetic flux thereof intersects the windings of said solenoid coil at right angles thereto whereby a magnetic circuit is defined by said yoke with said core and permanent magnetic means to provide a magnetic force causing said bobbin to move relative to said core when electric current passes through said coil, spring means biasing said bobbin to a position wherein said valve means closes said aperture, first resilient means sealingly mounting said one end of said core and said one end of said yoke in said body adjacent said inlet port and providing resilient stopper means for said valve means and second resilient means supporting the opposite end of said yoke within said body wherein said yoke is provided with apertures through which a portion of said first resilient means protrude to define said resilient stopper means for said valve means and is provided with additional passage means communicating said apertures in said core with said outlet port.

* * * * *